Figure 1:
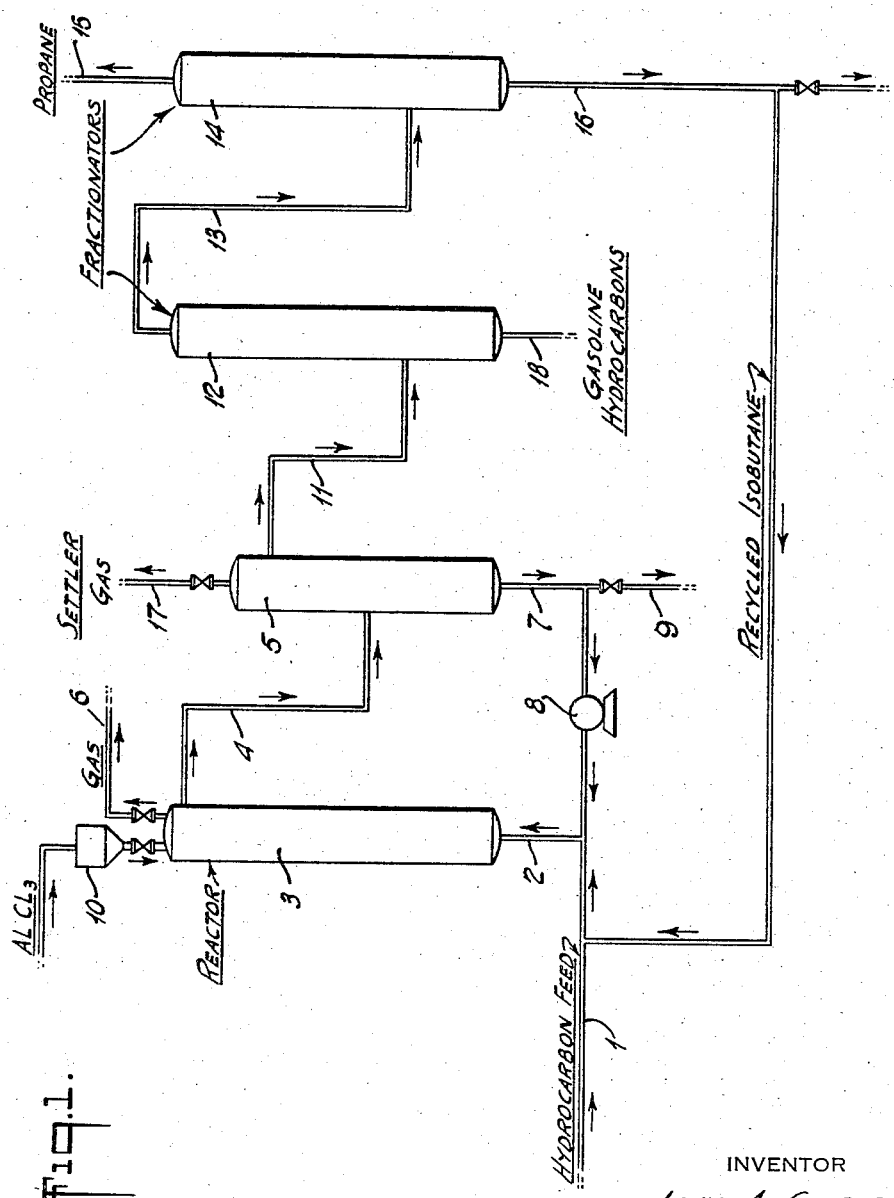

Patented June 18, 1946

2,402,126

UNITED STATES PATENT OFFICE 2,402,126

ALKYLATION OF HYDROCARBONS

Louis A. Clarke, Fishkill, N. Y., assignor to The Texas Company, New York, N. Y., a corporation of Delaware Application December 27, 1943, Serial No. 515,649

3 Claims. (Cl. 260—683.4)

This invention relates to the alkylation of olefin hydrocarbons with paraffin hydrocarbons in the presence of an alkylation catalyst comprising a metallic halide such as aluminum chloride. It has particular application to the manufacture of high anti-knock gasoline hydrocarbons suitable for use in the production of motor fuel.

This is a continuation-in-part of my copending application Serial No. 327,575, filed April 3, 1940, and of my copending application Serial No. 439,299, filed April 17, 1942.

Broadly, the invention contemplates a process for the alkylation of olefin and paraffin hydrocarbons by contact with an alkylation catalyst comprising an active metallic halide, dispersed or suspended in an agitated liquid medium. The liquid medium comprises complex metallic halide-hydrocarbon compounds such as produced in a conventional alkylation reaction wherein a catalyst such as aluminum chloride has been employed with the resultant production of complex compounds. The complex material may be such as produced in the isomerization of normal paraffin hydrocarbons during contact with anhydrous metallic halides. A suitable complex material may also be prepared directly by reacting aluminum chloride or other active metallic halide with paraffin or olefin hydrocarbons, for example kerosene or naphtha. It may also be prepared by reacting the metallic halide with alkyl halides such as propyl and butyl chlorides.

In accordance with the invention, a large liquid body of preformed metallic halide-hydrocarbon complex is maintained in an agitated condition within the reaction zone. The active metallic halide catalyst is suspended or dispersed in the agitated liquid and the reaction is effected in a continuous manner by continuously passing the olefin and paraffin hydrocarbons to be treated through the agitated mass.

The process of this invention is particularly applicable to the alkylation of ethylene or hydrocarbon mixtures containing mainly ethylene as the olefinic constituent with an isoparaffin hydrocarbon such as isobutane for the production of low boiling normally liquid gasoline hydrocarbons of high anti-knock value.

Alkylation of olefin and isoparaffin hydrocarbons with aluminum chloride as a catalyst has been proposed previously. For example, U. S. Patent 2,174,883 describes the alkylation of ethylene with isobutane by contact with solid aluminum chloride in a batch type of operation at relatively low temperatures.

Heretofore, considerable difficulty has been experienced in attempting to alkylate hydrocarbons with aluminum chloride as the catalyst in a continuous manner due to the rapid deterioration of the catalyst. During the reaction, the metallic halide enters into reaction with the hydrocarbons or hydrocarbon products forming gummy and sticky compounds.

This gummy material soon results in binding the solid particles of catalyst together producing an impervious mass which ultimately exerts little or no catalytic effect. In this way efficient contact between the active halide and the hydrocarbons undergoing the treatment is prevented.

The present invention involves the discovery that the process can be carried out continuously without encountering the foregoing difficulties by maintaining the active metallic halide suspended or dispersed in an agitated liquid body of preformed metallic halide-hydrocarbon complex compounds so that efficient contact between the hydrocarbons and the active catalyst is realized over a prolonged period of time. To some extent the active metallic halide may be dissolved in the complex liquid. At any rate it has been found that by maintaining the proportion of complex liquid to active metallic halide relatively large it is possible to maintain the metallic halide in an active and effective form over a prolonged period of operation.

In order to describe the invention further, reference will now be made to the accompanying drawings which illustrate preferred embodiments for carrying out the process in a continuous manner.

Figure 2:
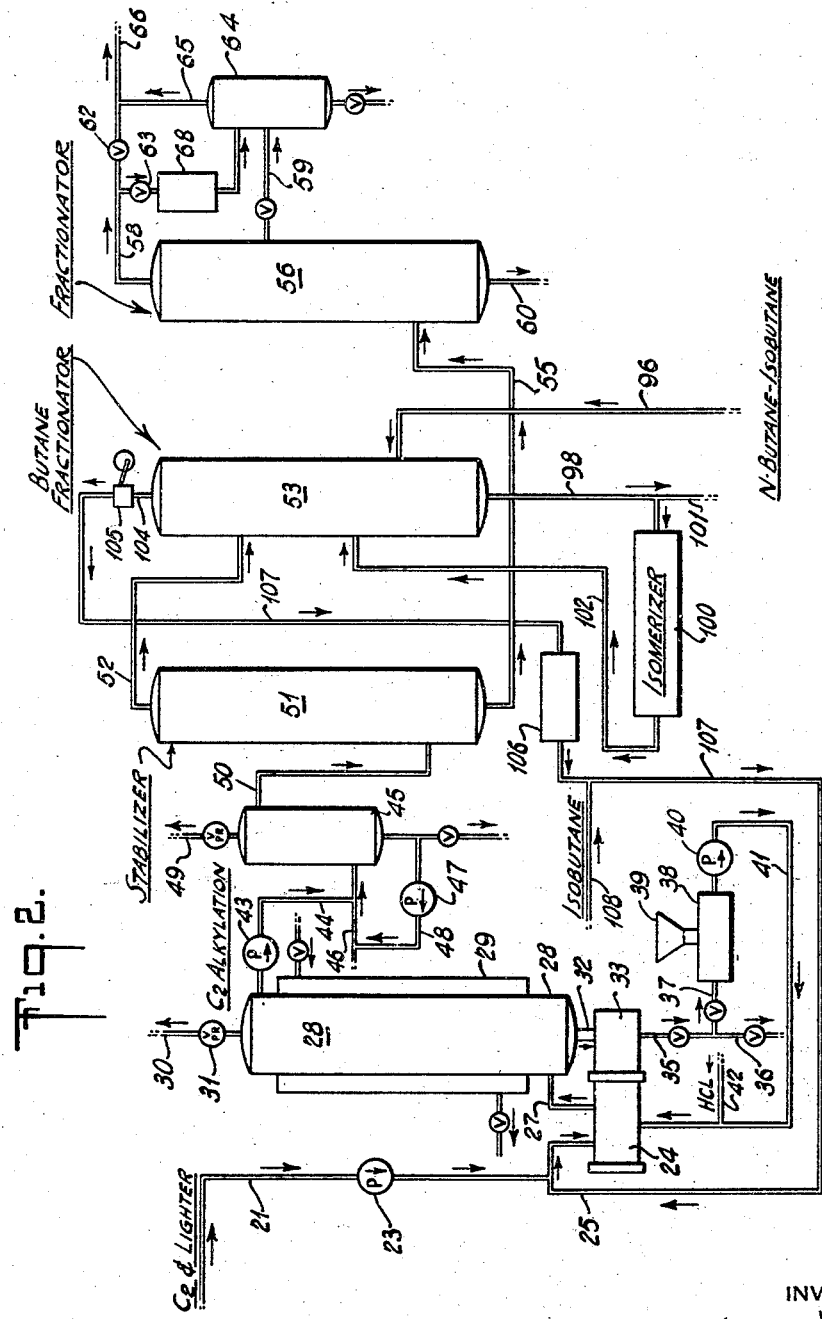

Fig. 1 is a diagrammatic view of apparatus, including an agitated reactor of the jet type with catalyst recycle, for carrying out the method of the present invention; and Fig. 2 is a diagrammatic view of apparatus, including a reactor of the rotary or centrifugal pump type, together with fractionating and isomerizing equipment, particularly designed for handling refinery cracking gas fractions in isobutane-ethylene alkylation.

Referring to Fig. 1 of the drawings, the hydrocarbon feed comprising olefin and isoparaffin hydrocarbons is drawn from a source not shown through a pipe 1 communicating with a pipe 2 and through which the feed is introduced to the bottom of a reaction vessel 3.

The reaction vessel is maintained substantially filled with a fluid and pumpable mixture comprising the active metallic halide suspended in complex liquid and other hydrocarbons present.

The reaction mixture is continuously drawn off from the top of the vessel through a pipe 4 leading to a settler 5. Any gaseous constituents accumulating in the upper portion of the reaction vessel may be vented off through a valved pipe 6.

The mixture entering the settler 5 from the reaction vessel comprises alkylated hydrocarbons and metallic halide-hydrocarbon complex liquid as well as solid particles of the metallic halide suspended therein. This mixture undergoes phase separation in the settler 5, the complex liquid containing solid metallic halide settling to the bottom of the settler. The separated complex liquid and suspended matter is continuously drawn off through a pipe 7 and all or in part returned by a pump 8 to the bottom of the reaction vessel 3, that portion not returned being discharged from the system through a pipe 9.

The recycling rate is maintained sufficiently high so as to thoroughly agitate the mixture within the reaction vessel 3 and thereby keep the solid catalyst particles suspended in the liquid mixture.

A hopper device 10 is provided through which to introduce fresh metallic halide in pulverulent form to the upper portion of the reaction vessel. The fresh catalyst is introduced continuously or intermittently so as to provide make-up sufficient to compensate for catalyst being discharged from the system in the form of complex material. The make-up is added in sufficient amount to insure the presence of a substantial amount of active catalyst suspended and dissolved in the agitated liquid mixture.

The upper phase separated in the settler 5 comprising alkylated hydrocarbons is drawn off through a pipe 11 to a fractionator or stabilizer 12 wherein normally gaseous hydrocarbons including propane and isobutane may be removed in vapor form through a pipe 13 leading to an auxiliary fractionator 14. In the fractionator 14 propane and other light gaseous hydrocarbons may be separated and discharged through a pipe 15 while a condensed fraction comprising isobutane is withdrawn through a pipe 16. The isobutane fraction so removed may be returned all or in part to the reaction vessel 3 as indicated.

Provision is made for venting gaseous constituents from the settler 5 through a valved pipe 17. Such bases may include methane, ethane, hydrogen and some hydrogen chloride. The gases so removed may be subjected to further processing for the purpose of separating hydrogen chloride and isobutane and returing them to the reactor 3, the separated hydrogen chloride being used to activate the metallic halide catalyst and the isobutane for reaction with fresh olefin feed.

The condensate withdrawn from the bottom of the fractionator 12 through a pipe 18 will comprise gasoline hydrocarbons produced in the reaction and suitable for the production of high anti-knock motor fuel.

When alkylating ethylene or an olefin fraction consisting essentially of ethylene with isobutane, the reaction vessel is advantageously maintained at a temperature of at least around 110° F. or at a temperature in the range of 110-130° F. and under a pressure of around 125-250 lbs. gauge. In carrying out the operation with ethylene and isobutane, the feed advantageously comprises a substantial molar excess of isoparaffin to olefin, for example about one molal part of olefin to five parts of isoparaffin.

When operating in accordance with the method of flow illustrated for the alkylation of ethylene and in which fresh aluminum chloride is being added continuously, it is desirable to add continuously a small amount of propylene or butylene so as to maintain during the alkylation reaction a complex mixture of desired character, namely, a more satisfactory fluid medium in which to suspend the solid aluminum chloride. The amount of propylene or butylene so added should be substantially less than 20% by weight of the ethylene being charged and preferably is in the range of about 5 to 10%.

The procedure may be modified so that the aluminum chloride may be added continuously in the form of a suspension or dispersion in preformed aluminum chloride-hydrocarbon complex.

In any event, it is deemed desirable to have a small amount of hydrogen chloride present in the catalyst.

While the process of the present invention employing the fortified aluminum chloride-hydrocarbon complex catalyst can be used for the alkylation of various isoparaffins, such as isobutane and isopentane, with various olefins including propylene, butylenes, pentalenes, olefin polymers, cracked naphtha fractions, etc., it is particularly advantageous for the alkylation of isobutane with ethylene for the production of 2,3 dimethyl butane or an alkylate of high antiknock value containing a high proportion of 2,3 dimethylbutane.

I have found that by the use of different and critical conditions of operation in this isobutane-ethylene alkylation, a substantially increased yield of a markedly different and superior type of alkylate consisting largely of the isohexane, 2,3-dimethyl butane, can be produced in continuous operation with greatly increased catalyst life. The process of the present invention can be employed to produce substantially pure 2,3 dimethyl butane in large yields, or can be utilized to produce alkylate containing the high content of 2,3-dimethyl butane and possessing superior qualities of boiling distribution range, higher octane and low volatility or R. V. P., which makes it an excellent blending stock for motor fuel or aviation gasoline.

In accordance with the present invention, isobutane is alkylated with ethylene in a continuous process wherein a much larger volume ratio of the aluminum chloride-hydrocarbon complex catalyst to total hydrocarbons is maintained in the reaction zone than has heretofore been proposed, and wherein a much shorter time of contact between the reacting hydrocarbons and the catalyst than has heretofore been suggested, is employed. Thus, a volume ratio of catalyst to total hydrocarbons in the reaction zone of at least 0.2:1, and preferably of the order of about 0.5:1 to 1:1 or higher, is used. The time of contact is reduced to less than twenty minutes, and may be as short as about five minutes, and preferably ranges between ten and fifteen minutes. Further, as mentioned above, a temperature range somewhat higher than that heretofore proposed has also been found critical in producing the advantageous results of the present invention. Thus, temperatures within the range of 110-130° F. or somewhat higher are employed.

Further, as distinguished from the prior practice in this art, where substantial amounts of a hydrogen chloride promoter of the order of 1% by weight or more on the total reacting hydrocarbons treated have been specified, only very small amounts of HCl promoter less than about 0.2% by weight of the hydrocarbon charge in continuous operation are utilized. Preferably, the proportion of HCl on the basis of the hydrocarbon charge varies from about a trace to about 0.1% by weight. The hydrocarbon charge stocks may contain sufficient water to produce this small amount of HCl by reaction with the aluminum chloride; or small amounts of HCl, water, alkyl chloride or other material producing the minute amount of HCl promoter in the reaction zone can be added continuously or intermittently, such as with the hydrocarbon charge or with the recycled catalyst. Higher proportions of promoter have been found to cause degradation of the product and involve other disadvantages.

The hydrocarbon charge may comprise substantially only ethylene as the olefinic constituent thereof, but a small amount of propylene within the critical range set forth above is preferably included in the charge to maintain the fluidity of the complex catalyst in continuous operation. Higher proportions of propylene result in substantial alteration of the composition of the product with a resultant lowering in octane number thereof and a reduction in catalyst life. The charge may comprise substantially pure hydrocarbons, namely, isobutane and ethylene, or ethylene containing a small proportion of propylene; but preferably refinery fractions are utilized to avoid the expense inherent in effecting separation of the pure compounds.

For example, a $C_2$ and lighter fraction containing ethylene, ethane, hydrogen and methane and with a small proportion of propylene as specified, can be satisfactorily employed under the conditions stated. The isobutane may be obtained from any suitable source, such as from refinery gas or from natural gas, and may be mixed with a small proportion of normal butane without deleterious results. For example, an isobutane-rich fraction containing about 90–95% isobutane and 10–5% normal butane as regularly produced in commercial debutanizing fractionating equipment is satisfactory. The hydrocarbon charge is continuously added to the agitated reaction zone so as to maintain the isobutane in substantial molar excess of at least about 3:1 and up to about 6:1 and higher with respect to the olefin or ethylene content. Sufficient pressure is utilized to maintain the isobutane in liquid phase. Under these conditions, the gaseous $C_2$ fraction is intimately mixed with the relatively large liquid body of aluminum chloride-hydrocarbon complex catalyst and liquefied isobutane such that the ethylene is rapidly absorbed and reacted with the isobutane to produce the desired normally liquid alkylate. The reaction products pass continuously to a settling zone where a liquid hydrocarbon phase containing the excess isobutane and heavier separates from the catalyst phase, which latter may be continuously recycled, in whole or in part, with suitable fortification with fresh aluminum chloride as needed, to the reaction zone. The fixed and unreacted gases of the $C_2$ and lighter fraction are released from the settling zone and thus separated from the liquid product which is then neutralized, stabilized and fractionated into the desired motor fuel fractions.

Under the conditions specified, a debutanized liquid alkylate is obtained which has a volume content in excess of about 70%, and generally about 80–85%, of 2,3-dimethyl butane. The remaining content of the alkylate is made up largely of octanes with only a few percent of pentanes and material higher boiling than octanes. Where propylene is present in the charge, a small proportion of heptanes are also produced. At least about 95–98% of the product boils below 311° F. and this fraction has a C. F. R. M. octane in excess of 90 and generally about 92–95.

Referring to Fig. 2 of the drawings, a $C_2$ and lighter cracked gas refinery fraction, containing a small amount not more than 10% by weight of propylene on the basis of the ethylene therein, is introduced by pipe 21. A pump 23 forces the $C_2$ and lighter fraction into a continuous reactor 24 of the centrifugal pump type having large clearances between the impeller and rotor housing.

A stream of liquefied isobutane is introduced by line 25 so as to mix with the $C_2$ and lighter fraction prior to contact of the latter with the complex suspension catalyst maintained in the reaction zone within the housing of reactor 24. The proportion of isobutane is regulated to provide the desired large molar excess on the basis of the olefin charged, as set forth above. A quantity of complex suspension catalyst is maintained within the circulating system, so that a volume ratio of catalyst to total hydrocarbons of the order previously stated is continuously maintained within the reaction zone.

Reaction products are continuously discharged by line 27 into the lower portion of a vertical settler 28 equipped with a water jacket 29, whereby the temperature of both the reaction and settling zones is maintained at about 110–130° F. or somewhat higher. In settler 28, stratification into a lower complex suspension catalyst layer, an upper liquid hydrocarbon layer, and a supernatant atmosphere of fixed and unreacted gases occurs. These gases comprising the unreacted ethane, methane and hydrogen are released from the upper portion of settler 28 by line 30 equipped with pressure release valve 31. Catalyst is continuously returned by the large diameter line 32 to the inlet 33 of reactor 24.

In order to maintain the activity of the catalyst during long periods of continuous operation, a portion of the circulating catalyst body is withdrawn by valve controlled line 35 connecting with valve controlled discharge line 36 and valve controlled line 37. The major portion of the withdrawn catalyst preferably passes by line 37 into a mixer 38 equipped with suitable feed hopper 39 through which makeup solid aluminum chloride is supplied to the contents within mixer 38. The revivified complex suspension is returned by pump 40 through line 41 to the reaction zone. A line 42 provides for the introduction of any required amount of HCl into the recycled catalyst stream passing to the reactor.

The unstabilized hydrocarbon liquid within settler 28 is continuously removed by pump 43 controlled by a constant leveling device and passed through line 44 into a neutralizer 45 wherein it is treated and neutralized by caustic soda solution supplied through line 46. The neutralized hydrocarbons separate into a supernatant layer from a lower caustic solution layer, which latter may be continuously recirculated by pump 47 and recycle line 48. Any remaining light gaseous hydrocarbons may be removed from the upper portion of neutralizer 45 by line 49 containing a suitable pressure release valve.

The neutralized hydrocarbons pass by line 50 into the stabilizer 51 wherein the alkylate is debutanized. The removed gases consisting essentially of the excess isobutane together with a minor proportion of normal butane are passed by line 52 to a butane fractionator 53 to be hereinafter further described.

The stabilized C₂ alkylate passes from the lower portion of stabilizer 51 through line 55 to fractionator 56 where the alkylate is separated into the desired motor fuel fractions. Where the object is to produce substantially pure 2,3-dimethyl butane, the fractionator may be operated to take overhead by line 58 and C₅'s, and to remove by side stream 59 a close-cut hexane fraction having a boiling range of about 125–150° F., the remaining alkylate being discharged as bottoms by line 60 for use in motor fuel manufacture or other suitable purpose. In this case, valve 62 is open and valve 63 is closed. The side stream passes into an accumulator 64 from which vaporized hydrocarbons may be removed by overhead line 65 connecting with the gas discharge line 66 through which the gaseous products may be led to suitable condensers for recovery of the desirable pentane fraction. Inasmuch as this fraction contains a high proportion of isopentane, it may be led to a further fractionator where substantially pure isopentane may be recovered for blending stock.

If desired, fractionator 56 may be operated to take overhead a C₅–C₆ fraction; and in this case valve 62 is closed and valve 63 is opened so that the fraction passes through condenser 68 into accumulator 64, the side stream 59 being closed. Where the entire alkylate boiling within the aviation range is desired, fractionator 56 may be operated to take overhead a 311° F. end point fraction which passes through condenser 68 into accumulator 64, and only the small higher boiling bottoms is removed by line 60. While a single fractionator 56 has been shown, it is of course obvious that one or more fractionators may be employed in series, whereby any desired close-cut fraction such as substantially pure 2,3-dimethyl butane may be obtained.

A bottoms fraction consisting essentially of normal butane is removed by line 98 from the butane fractionator 53 and any portion thereof passed to a conventional isomerization unit 100, any excess being discharged by line 101. In the isomerization unit 100, the normal butane is converted to the extent of about 50–60% or more by volume into isobutane, such as by treatment in well known manner with conventional isomerization catalysts of the character of aluminum chloride, as disclosed in U. S. Patents Nos. 2,271,860, 2,208,362, 2,249,366 and 2,266,011. As the isomerization step per se forms no part of the present invention, further description thereof is thought unnecessary.

The resulting isomerized products are returned by line 102 to fractionator 53. Make-up isobutane for the system may be supplied by a mixed n-butane-isobutane stream, such as a C₄ fraction from the stabilization of natural gasoline, which is introduced by line 96 into fractionator 53. Preferably, the points of introduction of lines 52, 96 and 102 into fractionator 53 are at different levels, depending upon the isobutane content of the materials handled by these various lines. The overhead gases from the stabilization of the C₂ alkylate being highest in isobutane content are introduced adjacent the upper end of the butane fractionator. The isomerization products of line 102, being generally lower in isobutane content, are introduced below the mid-portion of the fractionator; and the C₄ fraction from the stabilization of the natural gasoline, which generally runs in excess of 60% by volume of n-butane is introduced at a still lower point. With suitable reflux, as is well known, it is possible to take overhead by line 104 an isobutane-rich fraction consisting of about 95% or more of isobutane by volume. This fraction is compressed and liquefied by compressor 105 and cooler 106, and recycled by line 107 to line 25 and the alkylation reactor. Any additional isobutane required for the process may be introduced from an extraneous source by line 108.

An important feature of the present invention is based on the discovery that an aluminum halide-hydrocarbon complex alone, that is, the clear complex liquid separated from unreacted hydrocarbon and any non-liquid sludge, is comparatively inactive for this alkylation reaction, or has at best merely a "flash" activity which is rapidly spent in continuous operation. When it is attempted to maintain the activity of such a complex liquid in continuous operation by discharge of a portion of the liquid and fortification with fresh complex liquid, this requires an uneconomical amount of aluminum halide in preparing sufficient fresh make-up complex liquid, and the results are not satisfactory. In accordance with the present invention, the preformed complex liquid is activated for use in the alkylation operation by the addition of fresh aluminum halide so as to disperse the added aluminum halide in an active form in the liquid complex. Very satisfactory complex liquids are obtained by heating aluminum chloride with kerosene or other light oil petroleum fractions, such as a higher boiling naphtha or a gas oil. Also, a very satisfactory complex liquid is prepared by reacting aluminum chloride with tertiary butyl chloride. It is to be noted that the complex liquid is of the same general character as that formed from the active aluminum halide when the latter is consumed in the alkylation operation.

To the body of preformed aluminum halide-hydrocarbon complex liquid is added additional aluminum halide to form the so-called activated complex catalyst. This consists of the complex liquid containing suspended and/or dissolved aluminum halide in active form. When utilizing this activated complex catalyst, it appears that mainly the active dispersed aluminum halide is consumed; and the activity of the catalyst in continuous operation is maintained by adding additional fresh aluminum halide to the originally prepared activated complex catalyst, either continuously or intermittently. It has been found that by maintaining the proportion of complex liquid to added active dispersed aluminum halide relatively large, it is possible to maintain the catalyst in an active and effective form for a long period of continuous operation by the addition of a relatively small amount of fresh aluminum halide, with resulting high economy in the consumption of aluminum halide. A large body of the activated complex catalyst relative to the total hydrocarbons maintained at any one time in the reaction zone can thereby be economically used for best results. This provides highly effective contact between the dispersed active aluminum halide and the reacting hydrocarbons. Further, by the use of a small proportion of higher molecular weight olefin, such as propylene, which should be present in an amount less than about 10% by weight of the ethylene in the charge, coupled with the addition of fresh aluminum halide to the catalyst body as the operation proceeds, and preferably with the addition of a small proportion of a hydrogen halide less than 0.1% by weight of the hydrocarbons in the reaction mixture, the catalyst can be maintained in a fluid and pumpable condition over long periods of operation while its activity is preserved at a high level.

In the preparation of the aluminum halide-hydrocarbon complex liquid, the proportions of the aluminum halide and the hydrocarbon or alkyl halide can be varied materially, since the aluminum halide reacts with the oil to form a complex liquid and unreacted oil can then be separated from the heavier complex liquid by stratification. As excess of the aluminum halide on the basis of the oil may be used, and the complex liquid readily separated by decantation from the excess unreacted non-liquid or solid aluminum chloride sludge. Frequently in the preparation of the complex liquid, there will remain both unreacted hydrocarbon and non-liquid aluminum halide sludge which are separated from the complex liquid.

Any of the above complex liquids themselves are comparatively ineffective as alkylation catalysts, particularly in the alkylation of isobutane with ethylene where poor yields of products generally lower in 2,3 dimethylbutane content are obtained. However, when a small proportion of fresh aluminum halide is added to and retained in active dispersed form in the complex liquid, a superior catalyst for purposes of the present invention is produced. The amount of active aluminum halide maintained dispersed in the complex liquid can vary within wide limits, it being sufficient to merely add enough aluminum halide to substantially saturate the complex liquid with dissolved aluminum halide, provided the activity is then maintained in continuous operation by frequent or continuous addition of fresh aluminum halide to the catalyst body. On the other hand, a sufficient amount of aluminum halide may be initially added to the preformed complex liquid to more than saturate that liquid, the excess then remaining in suspended form in the catalyst body. The upper limit is determined by the ability of the complex liquid to keep the excess suspended aluminum halide properly dispersed to avoid settling in and clogging of the circulating lines and tanks, and so that the catalyst has proper viscosity and fluidity to be readily pumped through the system. The latter type of catalyst retains its activity over a substantially longer period of continuous operation without fortification with additional fresh aluminum halide, since there is a larger amount of active dispersed aluminum halide to be consumed before the activity of the activated catalyst is impaired; and, in this case, the fortification of the catalyst during continuous operation may be made intermittently at less frequent intervals of time, although continuous fortification can also be used with good results. Generally, solid aluminum chloride in particle form is initially added to the preformed complex liquid in the proportion of about 25–300 grams of aluminum chloride to about 600 cc. of the complex liquid to form the activated catalyst that is charged to the system. Thereafter, fresh aluminum chloride is added to the catalyst in the alkylation system as needed to maintain the activity and fluidity thereof, with the result that catalyst consumption in accordance with the present invention may be as low as one pound of aluminum chloride per 20–30 or more gallons of debutanized alkylate.

The present invention is markedly distinguished in operation and beneficial results from that previously proposed in Patent No. 2,174,883 for example, where the solid aluminum chloride is suspended directly in the isobutane and hydrocarbons undergoing reaction. In the latter case, the said hydrocarbons are much lighter and do not possess the ability to keep the added aluminum chloride properly dispersed, with the result that the solid catalyst settles out in quiescent parts of the system, and the lines may soon become clogged. Moreover, while the solid aluminum chloride particles tend to react with the hydrocarbons, particularly the heavier alkylate, to form complex, this reaction is slow at the temperatures employed for catalytic alkylation. The solid particles of aluminum chloride first pass through a sticky gummy stage in which the particles tend to bind together into an impervious mass of little or no catalytic effect. In a continuous system employing catalyst separation and recycle, these gummy particles cannot be handled and the operation cannot be continued. Consequently, the apparatus becomes inoperative long before the complex reaction has proceeded far enough to produce a complex liquid capable of maintaining the aluminum chloride particles properly dispersed in a fluid and pumpable condition.

In accordance with the present invention, a large body of the complex liquid is preformed and introduced into the alkylation system. The relatively smaller amount of added active aluminum chloride is maintained properly dispersed in this complex liquid without difficulty, even in quiescent parts of the system. The dispersed aluminum chloride reacts slowly to form additional complex liquid without passing through any noticeable sticky or gummy stage and without agglomeration. Moreover, in this case, the complex reaction serves to form more liquid of the same general character as the preformed body of complex liquid used as the suspending or dispersing medium. Consequently, the character of this medium is not objectionably altered during continued operation; and the activity of the catalyst is maintained merely by adding fresh aluminum chloride to make up for that consumed. Thus, the viscosity and pumpability of the activated complex catalyst are maintained reasonably constant over long periods of continuous operation, and the above-noted difficulties are effectively overcome.

While the above-noted Patent No. 2,174,883 also suggests pretreatment of the granular aluminum chloride with a highly reactive olefin, such as isobutylene, to activate the catalyst, this pretreatment is carried out in a manner to leave the aluminum chloride in solid particle form, rather than forming a complex liquid. Consequently, all the above-noted objections and difficulties still apply to the pretreated aluminum chloride particles, and the advantages of the present invention are not obtained.

The following examples are given as illustratory of the present invention, but it is to be understood that the invention is not restricted thereto:

EXAMPLE I

A refined kerosene, mainly paraffinic and naphthenic in character obtained from a mixed base crude, and having a boiling range of about 350–515° F., was used for preparing the complex liquid. One gallon of the kerosene was heated to 220–240° F. in a flask equipped with a stirring device. Powdered aluminum chloride was introduced into the flask in small increments while the heating and stirring was continued, until a total of 200 grams of aluminum chloride had been added over a period of about eight hours. The complex was then a mobile liquid at room temperature. The supernatant unreacted kerosene, which separated as an upper layer after the stirring was discontinued, was removed; and the complex then allowed to stand for a further period of time in order to settle out any unreacted aluminum chloride or solid sludge. The complex liquid was then decanted and thus removed from the non-liquid sludge.

An aluminum chloride-kerosene complex liquid prepared as described above was analyzed for heat of hydrolysis by mixing with water in a calorimeter, and also for carbon plus hydrogen content expressed as the "bound hydrocarbon content." The said complex liquid was found to have a heat of hydrolysis of 314 calories per gram of complex liquid, which calculated to 72 large calories per gram atom of active aluminum. The said complex was also found to have a carbon plus hydrogen content of 42.2% by weight on the basis of the complex liquid.

Two hundred and sixty eight grams of the above-described aluminum chloride-kerosene complex liquid were then mixed with 25 grams of fresh powdered aluminum chloride and 288 grams of an activated complex catalyst were obtained. This amount of the activated complex catalyst was added to a batch reactor equipped with a stirrer together with 1.000 cc. or 560 grams of isobutane. Then 90 grams of ethylene were charged into the reactor over a period of 20 minutes while the contents were agitated and maintained at a temperature of 110° F. The reaction mixture was settled, the complex catalyst removed, the hydrocarbon liquid stabilized and the alkylate distilled to separate the same into a 80–140° F. fraction and a residue boiling above 140° F. An activated aluminum chloride-kerosene complex prepared as described above was also analyzed for heat of hydrolysis and bound hydrocarbon content. The following table shows the conditions and results of this batch run:

*Table 1*

| | |
|---|---|
| Catalyst | 268 grams of aluminum chloride-kerosene complex liquid plus 25 grams aluminum chloride |
| Heat of hydrolysis of activated catalyst: | |
| Calories per gram of complex | 327 |
| Large calories per gram atom of active aluminum | 68.5 |
| Bound hydrocarbon content of activated catalyst, weight percent: | |
| Determined | 39.2 |
| Calculated | 38.6 |
| Isobutane grams | 560 |
| Ethylene do | 90 |
| Isobutane: Olefin molar ratio | 3.0 |
| Temperature °F | 110 |
| Total alkylate: weight percent yield basis olefin | 212 |
| 80–140° F. fraction: volume percent of total alkylate | 84.1 |
| Residue above 140° F.: volume percent of total alkylate | 15.9 |

Example II

The following continuous runs were made in a rotary reactor of the type shown in Fig. 2, in order to compare the effectiveness of the kerosene complex liquid alone with the activated kerosene complex catalyst. In each of these runs, the reactor was charged with the catalyst and then filled with isobutane. A hydrocarbon mix consisting of 90% isobutane and 10% ethylene by weight was then introduced at a rate of 0.1 pound per minute at a reactor temperature of about 110° F. Five 8-pound alkylate samples were collected from each run over a period of 6⅔ hours. These alkylate samples were stabilized and distilled, and the results averaged for each run. The following table summarized the conditions and results of these comparative runs:

*Table 2*

| Catalyst | Complex liquid alone, 600 cc. aluminum chloride-kerosene complex liquid | Activated complex, 600 cc. aluminum chloride-kerosene complex liquid plus 200 grams AlCl₃ |
|---|---|---|
| Heat of hydrolysis of catalyst: | | |
| Calories per gram of complex | 314 | 351 |
| Large calories per gram atom of active aluminum | 72.0 | 71.6 |
| Bound hydrocarbon content of catalyst, wt. per cent: | | |
| Determined | 42.2 | 34.7 |
| Calculated | ---- | 33.5 |
| Isobutane-ethylene mol ratio | 4.34 | 4.34 |
| Reactor temperature, °F | 110 | 110 |
| Total number of periods | 5 | 5 |
| Time in minutes for each period | 80 | 80 |
| Charge rate in pounds/hour | 6 | 6 |
| Contact time in minutes | 11.6 | 10.6 |
| Total debutanized alkylate: | | |
| Total volume in gallons | 0.7 | 1.7 |
| Average weight per cent yield basis olefin | 96 | 237 |
| 311° F. fraction: Average volume per cent of alkylate | 96.6 | 97.7 |
| Total distillate to 400° F.: Average volume per cent of alkylate | 97.6 | 99.2 |
| Bromine number of composite | 0 | 0 |
| C. F. R. M. octane number of composite | 92.0 | 92.3 |

The above results show that the kerosene complex liquid alone is comparatively inactive, producing a very low yield of alkylate over the relatively short period of 6⅔ hours. Moreover, the yields even in the first periods of the run with this complex liquid alone were quite low, being less than half the yields with the activated complex catalyst under the same conditions.

Example III

In this experiment an aluminum chloride-hydrocarbon complex liquid was prepared by reacting aluminum chloride with tertiary butyl chloride at room temperature, using one part by weight of aluminum chloride to 2.5 parts of the alkyl chloride. The reaction resulted in the breakdown of tertiary butyl chloride, with the evolution of HCl and hydrocarbon gases, and a lowering in temperature of the reaction mixture. The reaction mixture was allowed to stand until the evolution of gases had ceased when the reaction mixture had been brought back to room temperature. The resulting complex liquid was then separated from any supernatant hydrocarbon layer, and decanted from any non-liquid sludge or sediment. A complex liquid prepared in this manner was tested and found to have a heat of hydrolysis of 324 calories per gram of complex, which calculated to 78.4 large calories per gram atom of active aluminum, and a bound hydrocarbon content of 41.0% by weight on the basis of the complex liquid.

The following continuous run was made with this catalyst in a rotary reactor of the type shown in Fig. 2 to determine catalyst life.

600 cc. of the tertiary butyl chloride complex prepared as described above was activated by the addition of 200 grams of aluminum chloride. An activated catalyst prepared in this manner was tested and found to have a heat of hydrolysis of 343 calories per gram of complex, which calculated to 76.5 large calories per gram atom of active aluminum, and a bound hydrocarbon content which analyzed 34.5% by weight, and which calculated to 32.2% based on the bound hydrocarbon content of the tertiary butyl chloride complex liquid alone plus the known amount of activating aluminum chloride added. The said activated catalyst was charged to the reactor, and the latter then filled with isobutane.

A hydrocarbon mixture consisting of 90% isobutane, 9.1% ethylene, and 0.9% propylene by weight was charged continuously to the reaction vessel and subjected to intimate contact with the catalyst, the reaction temperature being maintained at about 110° F. The hydrocarbon feed was charged to the vessel at the rate of about one gallon of hydrocarbon per hour per pound of activated catalyst. Charging at this rate was continued for a period of about 26 hours, at the end of which time the catalyst was substantially completely spent.

As a result of this operation, there was produced a quantity of alkylated hydrocarbons which amounted to 6.4 gallons of total debutanized alkylate. 15.8 pounds of olefin had been charged before the above-described decrease in catalytic activity occurred. The resulting debutanized alkylate amounted to about 226% by weight on the basis of the olefin charged, and about 98% by volume of this alkylate distilled below 311° F. This 311° F. end point gasoline had a C. F. R. M. octane number of 91.9 and a bromine number of 0.

The above results show that the activated catalyst, containing a substantial excess of added aluminum chloride over that required to saturate the complex liquid, maintained its activity over a fair period of time. In catalyst depletion runs of this character with ethylene alone as the olefinic constituent, it was found that the activated complex catalyst tended to become considerably more viscous as its activity was reduced. In the present run, the presence of the propylene retarded the rate of viscosity increase of the catalyst, and showed a pronounced effect in maintaining the desired fluidity thereof. As pointed out above, the combination of the small amount of propylene in the charge with preferably a small amount of HCl, together with the regular or continuous addition of fresh aluminum chloride to the catalyst as the operation proceeds, effectively overcomes the tendency of the complex catalyst to change objectionably in viscosity, and the proper fluidity and pumpability of the catalyst as well as high activity thereof can be maintained over very substantial periods of continuous operation.

EXAMPLE IV

The following continuous runs were made to show the effect of fortification of the activated complex catalyst by the addition of fresh aluminum chloride for continuation of the alkylation reaction; and they also illustrate the critical nature of the temperature in this isobutane-ethylene alkylation reaction.

A rotary reactor of the type illustrated in Fig. 2 was charged with 600 cc. of the tertiary butyl chloride complex liquid prepared as described in Example III, together with 200 grams of aluminum chloride to activate the catalyst. The reactor was then filled with isobutane. A hydrocarbon charge consisting of 90% isobutane, 9.1% ethylene, and 0.9% propylene by weight was added continuously at a rate of 6 pounds per hour, while the reactor was maintained at a temperature of 78–85° F. 5.6 gallons of total debutanized alkylate were obtained in this Run 1 over a period of approximately 26 hours, at the end of which time the catalyst was substantially spent.

600 cc. of the spent complex from the above-described run were then charged to a rotary reactor together with 200 grams of fresh aluminum chloride, and isobutane to fill the reactor. The same charge as in Run 1 above was added continuously at a temperature of 78–85° F. over a period of about 6⅔ hours; but the reactivated catalyst was substantially inactive at this temperature and only about 0.6 gallon of total debutanized alkylate was produced for 40 pounds of hydrocarbon charge during this portion of Run 2. The temperature of the reactor was then raised to about 110° F., and the operation continued for a short period of about 2 hours. This was sufficient to determine that the activity had been restored by the use of the higher temperature and good yields of alkylate were secured.

To further investigate the effect of fortification, 500 cc. of the activated catalyst from Run 2 immediately above, together with 100 cc. of the spent complex from Run 1 above were charged to a continuous reactor together with 200 grams of aluminum chloride, and the reactor then filled with isobutane. The same hydrocarbon charge was then added continuously at a reactor temperature of 110° F. over a period of approximately 52 hours, obtaining 12.7 gallons of total debutanized alkylate in this Run 3. The 311° F. fraction amounted to 96.9 volume per cent of the total alkylate and had a bromine number of 0 and a C. F. R. M. octane number of 93.4.

The above runs showed that the complex catalyst could be fortified for continuation of the alkylation reaction by the addition of fresh aluminum chloride to the activated complex catalyst. The results also showed the critical effect of temperature on this isobutane-ethylene reaction. Thus, in Run 1 made with fresh activated catalyst at a temperature of 78–85° F., only about 12.4 pounds of olefin could be charged before a substantial decrease in catalytic activity occurred, with the result that only 5.6 gallons of alkylate were obtained. Fortification of this spent catalyst from Run 1 by the addition of aluminum chloride failed to restore the required activity of the catalyst for isobutane-ethylene alkylation in Run 2 at a temperature of 78–85° F., although the fortified catalyst was found to be active at 110° F. In run 3 above, utilizing a fortified catalyst under the same conditions as in Run 1 except that a temperature of 110° F. was employed, 25.9 pounds of olefin were charged before decrease in catalytic activity occurred, and 12.7 gallons of good quality debutanized alkylate were obtained. Moreover, the alkylate from Run 1 had a lower percentage of hexanes and a high percentage of material boiling above 160° F. than the alkylate from Run 3. The change in temperature from 78–85° F. to 110° F., thus resulted in more than doubling the life of the catalyst in enabling the catalyst to be fortified for continued alkylation, and in the production of a better quality alkylate containing a higher proportion of 2,3-dimethylbutane.

EXAMPLE V

The following runs were made to obtain a comparison of the kerosene complex prepared as in Example I above with the tertiary butyl chloride complex prepared as in Example III above. Each of these runs was carried out continuously in a rotary reactor of the character shown in Fig. 2 with continuous recirculation of the complex catalyst without revivification or the addition of fresh aluminum chloride, in order to obtain a measure of catalyst life. The following table summarizes the conditions and results of the run:

Table 3

|  | Run 1 | Run 2 |
|---|---|---|
| Olefin | Ethylene | Ethylene. |
| Isoparaffin | Isobutane | Isobutane. |
| Catalyst | 600 cc. kerosene-aluminum chloride complex + 200 grams aluminum chloride. | 600 cc. tertiary butyl-chloride-aluminum chloride complex + 200 grams aluminum chloride. |
| Mol ratio isobutane:ethylene | 4.34 | 4.34. |
| Temperature, °F | 110 | 110. |
| Contact time in mins | 11 | 11. |
| Volume ratio, catalyst to hydrocarbons in reactor | About 0.8:1 | About 0.8:1. |
| Charge rate of hydrocarbons in pounds per hour | 6 | 6. |
| Total debutanized alkylate: weight per cent yield basis of olefin | 226 | 238. |
| 311° F. end point fraction: volume per cent of alkylate | 98.8 | 93.9. |
| Bromine number | 0 | 0. |
| C. F. R. M. octane number | 93.8 | 95.0. |
| A. S. T. M. distillation of debutanized alkylate: |  |  |
| I. B. P., °F | 132 | 129. |
| 10 per cent | 137 | 136. |
| 20 | 140 | 138. |
| 30 | 141 | 140. |
| 40 | 142 | 142. |
| 50 | 144 | 144. |
| 60 | 146 | 146. |
| 70 | 149 | 148. |
| 80 | 159 | 155. |
| 90 | 197 | 181. |
| 95 | 232 | 232. |
| E. P | 273 | 260. |
| Volume per cent hexane fraction of debutanized alkylate | 85.0 | 85.1. |
| Higher than hexanes, volume per cent | 15.0 | 14.9. |
| Total gallons 2,3-dimethyl butane per pound of free aluminum chloride | 15.6 | 20.2. |

The above results indicate excellent effectiveness for both of the activated complex catalysts, there being a slight superiority in favor of the tertiary butyl chloride complex catalyst.

EXAMPLE VI

The following runs were carried out to determine the effect of varying the percentage of propylene in the charge for isobutane-ethylene alkylation. Each of the runs was carried out continuously in a rotary reactor in the manner described above, utilizing a reactor temperature of 110–115° F. with a hydrocarbon charge rate of 6 pounds per hour. A fresh tertiary butyl chloride complex liquid activated with 200 grams of aluminum chloride was used in each of Runs 1 and 3; the spent catalyst from Run 1 was fortified with 200 grams of aluminum chloride for Run 2; and the spent catalyst from Run 3 was fortified with a like amount of aluminum chloride for Run 4. The following table shows the results of these runs:

Table 4

|  | Run 1 | Run 2 | Run 3 | Run 4 |
|---|---|---|---|---|
| Charge: |  |  |  |  |
| Isobutane, wt. per cent | 90.0 | 90.0 | 90.0 | 90.0 |
| Propylene, wt. per cent | 0.9 | 0.9 | 2.0 | 2.0 |
| Ethylene, wt. per cent | 9.1 | 9.1 | 8.0 | 8.0 |
| Total debutanized alkylate, gal | 8.9 | 4.7 | 4.7 | 2.3 |
| Yield per pound active AlCl$_3$ |  | 10.7 |  | 5.3 |
| Olefin charged before decrease in catalytic activity, lb | 22.3 | 13.8 | 11.5 | 6.2 |
| Composition of alkylate: |  |  |  |  |
| Pentane-hexane, vol. per cent | 74.4 | 69.5 | 67.1 | 54.4 |
| Heptane, vol. per cent | 7.3 | 8.8 | 15.8 | 18.5 |
| Higher, vol. per cent | 18.3 | 21.7 | 17.1 | 27.1 |
| 311° F. fraction, vol. per cent | 97.6 | 94.8 | 96.3 | 84.7 |
| Br. No | 0 | 0 | 0 | 4 |
| Octane No. C. F. R. M | 93.4 | 93.4 | 92.0 | 92.0 |

The above results showed the critical effect of maintaining the proportion of propylene below about 10% by weight on the basis of the ethylene in this reaction. It will be noted that the catalyst life in Runs 3 and 4 is only about half that of Runs 1 and 2. Moreover, the quality of the alkylate with the higher proportion of propylene of Runs 3 and 4 is decidedly inferior to that produced in Runs 1 and 2 where the propylene was maintained within the critical range specified above.

EXAMPLE VII

The effect of HCl concentration in the hydrocarbon charge above the critical range specified heretofore is particularly evident in a sharp reduction in lead susceptibility of the alkylate. Even a proportion as low as 0.13% HCl by weight on the hydrocarbon charge gave a substantial reduction in lead susceptibility of the alkylate, as is evident from the following clear and leaded octanes obtained on typical 311° F. end point fractions of alkylates prepared from isobutane-ethylene charges containing a small proportion of propylene in accordance with the present invention:

Table 5

|  | Alkylate fraction prepared with 0.13% by weight of HCl in charge | Alkylate fraction prepared with merely trace of HCl in hydrocarbon charge |
|---|---|---|
| Clearostane No. C. F. R. M | 90.9 | 90.7 |
| +0.5 cc. TEL/gallon | 91.7 | 95.8. |
| +1.0 cc. TEL/gallon | 94.5 | Iso-octane+0.03 cc. TEL/gallon. |

In the above examples, certain figures for heat of hydrolysis have been given for the kerosene and tertiary butyl chloride complex liquids, and the resulting activated catalysts formed therefrom by the addition of aluminum chloride. It is to be understood that these figures apply only for the complex liquids prepared from the particular hydrocarbon fraction and alkyl chloride specified. The heat of hydrolysis of a complex liquid prepared from a naphtha fraction may differ from that of a kerosene fraction; likewise, the heat of hydrolysis of a complex liquid prepared from an aromatic or olefin hydrocarbon will be different from that of a complex liquid prepared from a paraffin hydrocarbon or a mixed paraffinic-naphthenic hydrocarbon fraction. This is pointed out since the heat of hydrolysis of the catalyst may be utilized as a convenient control test in operation; but this test must be related to the particular hydrocarbon used in forming the complex liquid. Different ranges of heat of hydrolysis will be used in operation for complex liquids formed from different hydrocarbons, and for the activated catalysts produced therefrom. In this connection, the heat of hydrolysis expressed in calories per gram of complex catalyst is used for control purposes, since no effective relationship for control purposes has been found between the heat of hydrolysis expressed as large calories per gram atom of active aluminum and the alkylating activity of the catalyst. In fact, as evident from Examples II and III above, the calculated value of the heat of hydrolysis in large calories per gram atom of active aluminum for the activated catalyst containing added dispersed aluminum halide may be lower than that for the complex liquid alone which is comparatively inactive.

Extensive tests on the kerosene complex catalyst have shown that the activated kerosene complex liquid reaches the desired high level of effectiveness at a heat of hydrolysis value of about 325–330 calories per gram of complex. As pointed out above, the kerosene complex liquid as freshly prepared had a heat of hydrolysis of about 314 calories per gram. This complex liquid as freshly prepared possesses some temporary catalytic activity; but it is essential for good results in continuous operation, as shown by Example II above, to add aluminum chloride to the complex liquid to maintain the heat of hydrolysis above 314 calories per gram, and preferably at least about 325–330 calories per gram. Likewise, the tertiary butyl chloride complex liquid as freshly prepared had a heat of hydrolysis of about 324 calories per gram; and sufficient aluminum chloride should be added to this liquid to maintain the heat of hydrolysis of the activated catalyst above 324 calories per gram and preferably at least about 330–335 calories per gram. The proper control ranges of heat of hydrolysis of activated complex catalysts formed from other hydrocarbons or alkyl halides can readily be determined by tests of the complex liquid as freshly prepared, and of the complex liquid containing added aluminum halide to activate the complex liquid to the desired high level, in accordance with the foregoing principles.

It has also been determined that, when aluminum chloride was added to the freshly prepared kerosene complex liquid in an amount in excess of that which would dissolve or otherwise be dispersed therein in a form which resists mechanical separation, the excess aluminum chloride remained in a suspended form which was capable of being separated from the complex liquid by centrifuging. The result of this centrifuge treatment was to reduce the heat of hydrolysis of this suspended type of kerosene complex catalyst from a value above 325–330 calories per gram down to a value of about 320 calories per gram. In accordance with the present invention, sufficient aluminum chloride is initially added to the preformed complex liquid to disperse aluminum chloride in the liquid in active form. Thereafter, in continuous operation, additional aluminum chloride is added to the system to maintain high activity of the catalyst, as best determined by analysis of the alkylate with respect to yield and quality.

While complex liquids prepared from aluminum chloride, and activated complex catalyst prepared by adding aluminum chloride to the complex liquids, have been specifically described above, it is to be understood that other aluminum halides, such as aluminum bromide, can be used in place of the aluminum chloride.

The expression "aluminum halide-hydrocarbon complex liquid" is used as a matter of convenience throughout the description and claims to signify the liquid produced by reaction of an aluminum halide with a hydrocarbon or hydrocarbon fraction as well as with an alkyl halide. The expression "activated complex catalyst," or other similar expression employing the word "activated," is used throughout the description and claims to signify the complex liquid containing added aluminum halide in dispersed and active form.

In my above-mentioned copending application, Serial No. 439,299, there is claimed the continuous alkylation of isobutane with ethylene in the presence of an aluminum chloride catalyst generically under certain critical conditions, including temperature, propylene content, isobutane to olefin molar ratio and promoter concentration herein disclosed to produce 2,3-dimethylbutane or an alkylate consisting primarily of 2,3-dimethylbutane.

Obviously, many modifications and variations may be made in the invention as herein set forth without departing from the spirit and scope thereof, and therefore only such limitations should be imposed as are indicated in the appended claims.

I claim:

1. In the continuous alkylation of isobutane with ethylene in the presence of an aluminum chloride-hydrocarbon complex liquid catalyst, the improvement which comprises continuously introducing isobutane in liquid phase together with olefins consisting of ethylene and a controlled proportion of propylene less than about 10% by weight of the ethylene, with the isobutane in substantial molar excess of said olefins, into an alkylation reaction zone containing a large fluid and pumpable body of the said complex liquid containing added dispersed active aluminum chloride, reacting isobutane with the ethylene therein under alkylating conditions including a temperature of about 110–130° F., a pressure sufficient to maintain the isobutane in liquid phase, and the said controlled proportion of propylene which is sufficient to maintain the fluidity of the complex liquid in continuous operation, continuously removing reaction products and separating complex catalyst liquid from the resulting hydrocarbons, returning separated complex liquid to the reaction zone to thereby maintain the liquid catalyst body within the system, adding uncomplexed fresh aluminum chloride to the catalyst body as the operation proceeds to provide the necessary makeup catalyst and to maintain active aluminum chloride dispersed in the complex liquid, the additional fresh aluminum chloride together with the propylene in the hydrocarbon charge serving to maintain the said activated body of complex liquid fluid and pumpable over long periods of continuous operation.

2. The method according to claim 1, wherein a portion of the separated complex catalyst liquid is diverted through a catalyst activating zone where solid aluminum chloride is added before said portion is returned to the reaction zone.

3. In the continuous alkylation of isobutane with ethylene in the presence of an aluminum chloride-hydrocarbon complex catalyst, the improvement which comprises preforming the complex catalyst liquid by heating aluminum chloride with a material selected from the group consisting of kerosene and tertiary butyl chloride, separating the resultant complex liquid from unreacted organic material and non-liquid sludge, adding additional aluminum chloride to the preformed complex liquid in an amount sufficient to retain active dispersed aluminum chloride present in the complex liquid, supplying a large body of the said preformed and activated complex liquid to an alkylation reaction zone, continuously introducing into said zone isobutane in liquid phase together with ethylene and a controlled proportion of propylene less than about 10% by weight of the ethylene, reacting isobutane with the ethylene under alkylating conditions including a substantial molar excess of isobutane to ethylene, temperatures of about 110–130° F., a superatmospheric pressure sufficient to maintain isobutane in liquid phase, and sufficient propylene to maintain the fluidity of the complex catalyst liquid in continuous operation, continuously separating complex catalyst liquid from resulting hydrocarbons, returning separated complex liquid to the reaction zone to thereby maintain the liquid catalyst body within the system, and adding additional aluminum chloride to the catalyst body as the reaction proceeds to maintain active dispersed aluminum chloride present in the complex liquid in an amount in excess of that which will react with hydrocarbons present therein to form complex liquid under the said alkylating conditions, the said additional aluminum chloride together with the propylene in the hydrocarbon charge serving to maintain the body of complex liquid fluid and pumpable over long periods of continuous operation.

LOUIS A. CLARKE.